United States Patent
Novis

(10) Patent No.: US 8,131,509 B2
(45) Date of Patent: Mar. 6, 2012

(54) METHOD OF SYSTEM DESIGN FOR FAILURE DETECTABILITY

(75) Inventor: Ari Novis, Rocky Hill, CT (US)

(73) Assignee: United Technologies Corporation, Hartford, CT (US)

( * ) Notice: Subject to any disclaimer, the term of this patent is extended or adjusted under 35 U.S.C. 154(b) by 485 days.

(21) Appl. No.: 12/053,607

(22) Filed: Mar. 23, 2008

(65) Prior Publication Data

US 2009/0240471 A1 Sep. 24, 2009

(51) Int. Cl.
*G06F 11/30* (2006.01)
*G06F 11/00* (2006.01)

(52) U.S. Cl. ......... 702/185; 702/186; 702/187; 702/188

(58) Field of Classification Search ........... 702/185–190
See application file for complete search history.

(56) References Cited

U.S. PATENT DOCUMENTS

| | | | |
|---|---|---|---|
| 5,067,099 A | 11/1991 | McCown et al. | |
| 5,099,436 A | 3/1992 | McCown et al. | |
| 6,109,110 A * | 8/2000 | Hwang | 73/654 |
| 6,132,168 A * | 10/2000 | Kovaleski et al. | 415/113 |
| 6,292,723 B1 | 9/2001 | Brogan et al. | |
| 6,499,114 B1 | 12/2002 | Almstead et al. | |
| 6,529,620 B2 | 3/2003 | Thompson | |
| 6,532,800 B1 * | 3/2003 | Boeckstiegel et al. | 73/40.5 R |
| 6,599,241 B1 | 7/2003 | Murphy | |
| 6,768,938 B2 | 7/2004 | McBrien et al. | |
| 6,909,994 B2 | 6/2005 | Johnson et al. | |
| 6,941,204 B2 | 9/2005 | Halm et al. | |
| 6,950,782 B2 | 9/2005 | Qiao et al. | |
| 7,043,402 B2 * | 5/2006 | Phillips et al. | 702/184 |
| 7,050,894 B2 | 5/2006 | Halm et al. | |
| 7,068,301 B2 | 6/2006 | Thompson | |
| 7,085,680 B2 | 8/2006 | Huang | |
| 7,103,610 B2 | 9/2006 | Johnson et al. | |
| 7,209,814 B2 | 4/2007 | Kipersztok et al. | |
| 7,260,501 B2 * | 8/2007 | Pattipatti et al. | 702/183 |
| 2006/0037222 A1 * | 2/2006 | Hunt et al. | 40/326 |
| 2006/0064291 A1 * | 3/2006 | Pattipatti et al. | 703/14 |
| 2008/0039993 A1 * | 2/2008 | Cleary et al. | 701/29 |

* cited by examiner

*Primary Examiner* — Phuong Huynh
(74) *Attorney, Agent, or Firm* — Carlson Gaskey & Olds

(57) ABSTRACT

A system designed for failure detectability through detection and isolation of a particular design feature.

21 Claims, 4 Drawing Sheets

| Hazard Severity Category | | HAZARD PROBABILITY | | | | |
|---|---|---|---|---|---|---|
| | | Frequent >1X10$^{-4}$ | Probable 1X10$^{-4}$ To 1X10$^{-5}$ | Occasional 1X10$^{-5}$ To 1X10$^{-6}$ | Remote 1X10$^{-6}$ To 1X10$^{-7}$ | Improbable 1X10$^{-5}$ To 1X10$^{-6}$ |
| Catastrophic | I | HRI 1 | HRI 2 | HRI 4 | HRI 8 | HRI 11 |
| Critical | II | HRI 3 | HRI 5 | HRI 6 | HRI 10 | HRI 15 |
| Marginal | III | HRI 7 | HRI 9 | HRI 12 | HRI 14 | HRI 17 |
| Negligible | IV | HRI 13 | HRI 16 | HRI 18 | HRI 19 | HRI 20 |

METHOD OF SYSTEM DESIGN FOR FAILURE DETECTABILITY

STATEMENT REGARDING FEDERALLY SPONSORED RESEARCH OR DEVELOPMENT

This invention was made with Government support under N000019-020C-3003 awarded by The United States Air Force. The Government has certain rights in this invention.

BACKGROUND

The present invention relates to optimization of a system for Prognostic and Health Management (PHM).

The major functionalities of engine Prognostics and Health Management are to detect faults and fault precursors, and to isolate those detected faults to the appropriate component for maintenance action. It may be impractical to monitor each component individually as each sensor may increase component weight and cost, decreases overall system reliability, and complicate packaging and access.

SUMMARY

A system designed for failure detectability according to an exemplary aspect of the present invention includes a system comprising a multiple of components and a holistic sensor suite, said holistic sensor suite operable to detect an abnormal occurrence of said system, said abnormal occurrence identifiable by said holistic sensor suite through detection and isolation of a particular design feature of each of said multiple of components.

A method of system design for failure detectability according to an exemplary aspect of the present invention includes incorporating a particular design feature into each of a multiple of components within a system; and identifying an abnormal occurrence with a holistic sensor suite through detection and isolation of the particular design feature.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows.

DETAILED DESCRIPTION OF THE EXEMPLARY EMBODIMENTS

Figure 1:
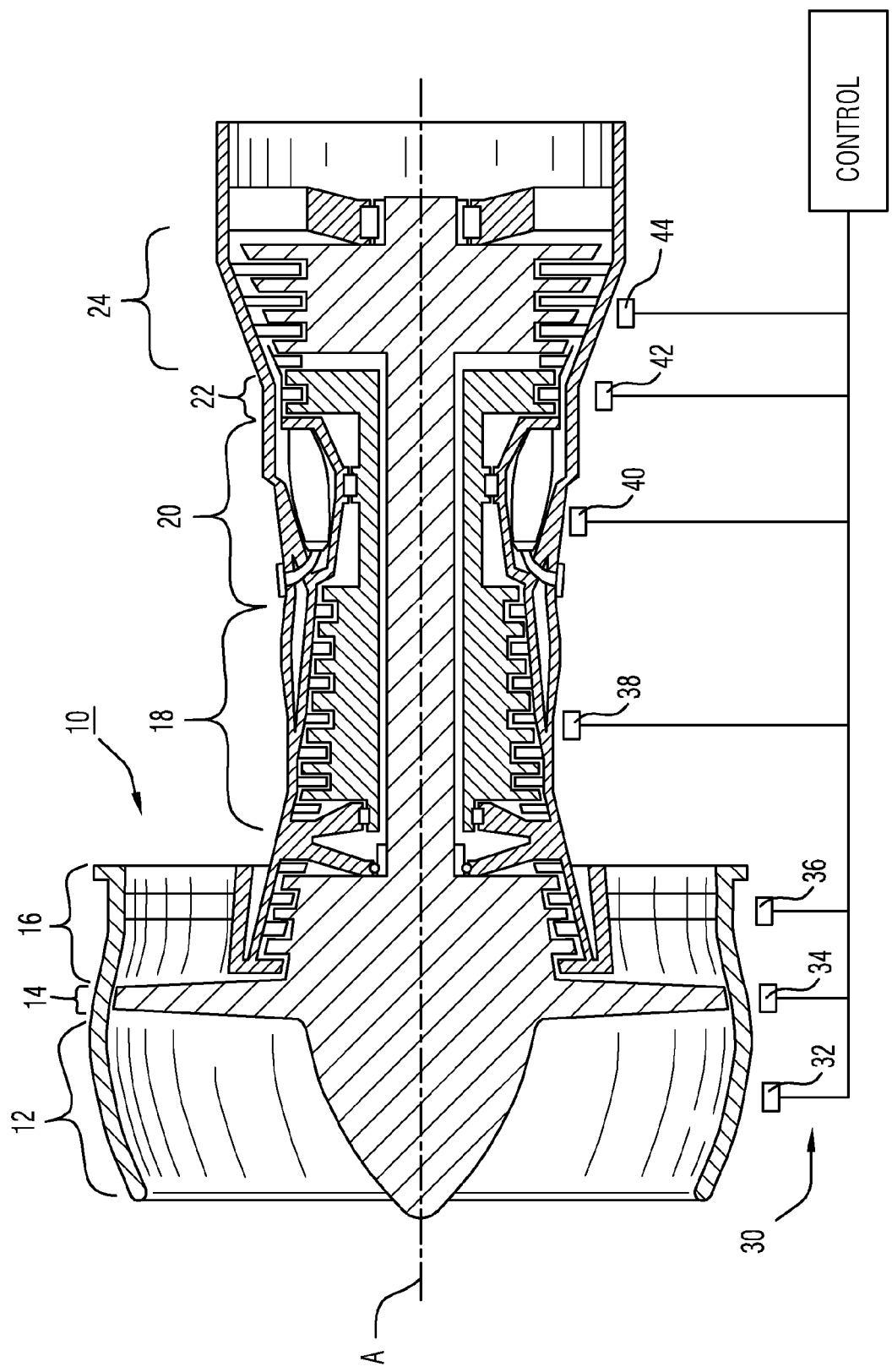
FIG. 1 schematically illustrates a system which may be designed for failure detectability.

One approach to optimizing life cycle cost savings is to utilize the minimum number of sensors in a sensor suite to monitor the maximum number of components within a system such as a gas turbine engine 10 which is illustrated schematically in FIG. 1. Although a gas turbine engine is illustrated and described in the disclosed non-limiting embodiment, other configurations systems and/or machines will also benefit herefrom.

A method of system design for failure detectability according to one non-limiting embodiment disclosed herein provides a systematic, objective, repeatable method to evaluate the system for the ability to detect and isolate faults and produce metrics for detection and isolation. The exemplary embodiments disclosed herein optimize design of the system for Prognostic and Health Management (PHM) instead of adapting the PHM system to the system such that improved fault detection and isolation with reduced false alarm rate is provided without an increased number of sensors.

The gas turbine engine 10, such as the illustrated turbofan gas turbine engine, is circumferentially disposed about an engine centerline A. The engine 10 includes an inlet module 12, a fan module 14, a low pressure compressor module 16, a high pressure compressor module 18, a combustion module 20, a two stage high pressure turbine module 22, and a low pressure turbine module 24. Each module typically includes a multitude of components. It should be understood that this schematic view is included to provide a basic understanding of the modules of the gas turbine engine, and not to limit the invention as this disclosure extends to all types of systems.

The gas turbine engine 10 includes a holistic sensor suite 30 which typically includes one or more holistic sensor 32-44 (illustrated schematically) which, in one non-limiting embodiment, are each associated with each of the system modules 12-24. The sensors 32-44 herein are primarily directed to holistic sensors, however, other sensors and combinations thereof may alternatively or additionally be utilized.

Holistic sensors typically measure system-wide attributes. A holistic approach is concerned primarily with a view of the entire system rather than a view of the system as a collection of components. For example, a relatively small number of properly placed vibration sensors can monitor moving/rotating components in an entire module or in the entire system. Examples of holistic sensors are vibration sensors and oil debris sensors. As another example, a single oil debris sensor will detect debris from all oil-washed components which are in communication with a working fluid (e.g. oil). Still other holistic sensor such as gas path sensors which measure other working fluids, vibration sensors which measure overall vibration signatures, and the like may alternatively or additionally be utilized. It should be further understood that other sensor technologies exist that monitor multiple systems.

Many abnormal occurrences such as failure modes and precursors thereto provide very subtle indications, if any at all. To detect the subtle indications of these "Uncooperative Faults", much conventional effort is directed to further development of sensors. Where the system and the diagnostics system therefor are designed together, however, the non-limiting embodiment disclosed herein transform "Uncooperative Faults" into "Cooperative Faults" which generate readily detectable precursors through design features of the system that will provide indicators to the sensor suite 30.

Figure 2:
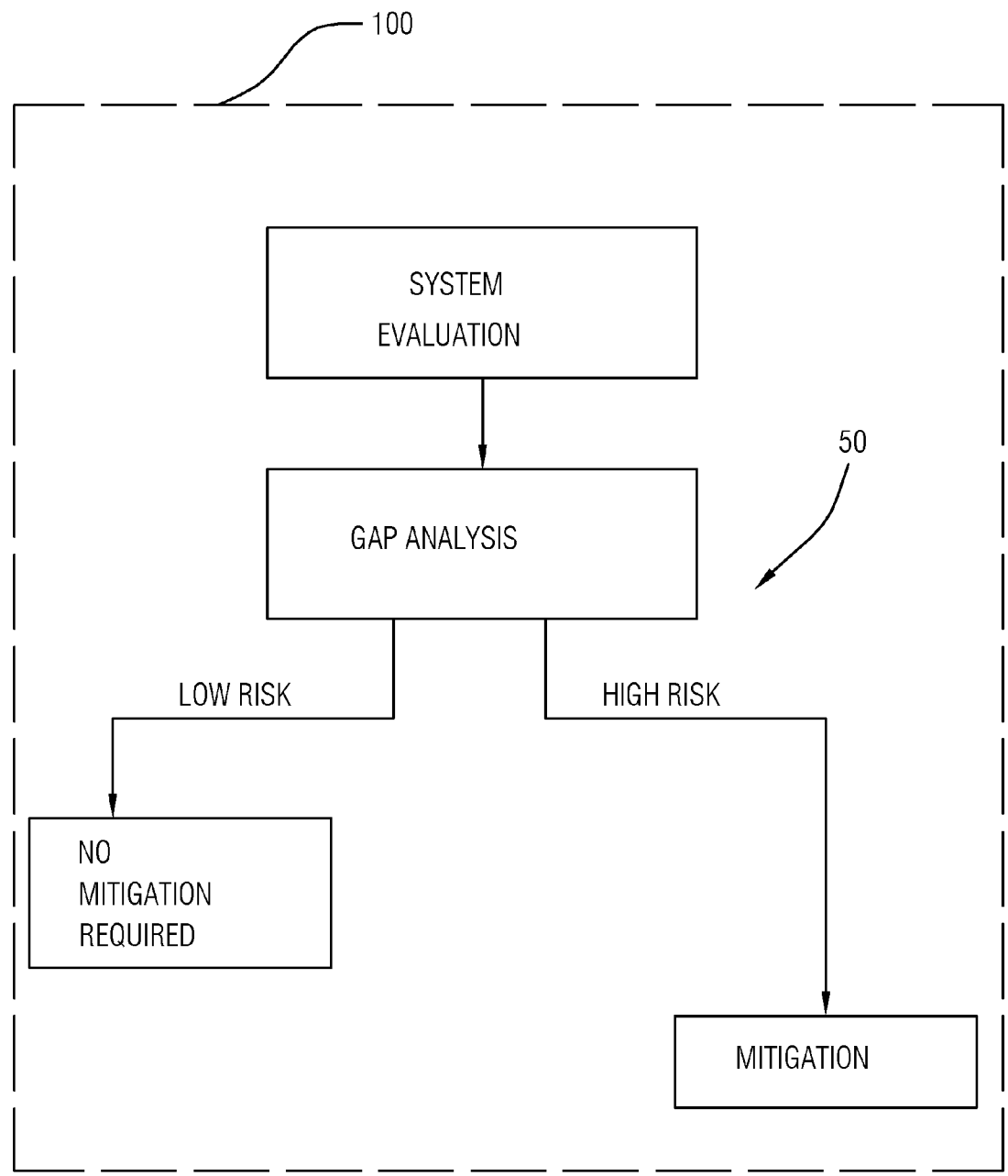
FIG. 2 illustrates a flowchart of a method of method of system design for failure detectability.

Referring to FIG. 2, a method of system design for failure detectability 50 according to one non-limiting embodiment disclosed herein facilitates design of features into the system 10 that will provide indicators to the sensor suite 30. The method includes a systematic process of comparing system failure modes against the sensor suite 30 to detect abnormal system operation—failures and their precursors. The method generally includes a System Evaluation phase, a Gap Analysis phase, and a Mitigation phase.

It should be understood, that the method of system design for failure detectability is performed through design of the system and the diagnostics system together to generate readily detectable precursors through design features of the system that will provide indicators to the sensor suite 30. It should also be noted that a computing device 100 can be used to implement various functionality, such as that attributable to the method of system design for failure detectability. In terms of hardware architecture, such a computing device 100 can include a processor, a memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM), such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device 100 is in operation, the processor can be configured to execute software stored within the memory, to communicate data to and from the memory, and to generally control operations of the computing device 100 pursuant to the software. Software in memory, in whole or in part, is read by the processor, perhaps buffered within the processor, and then executed.

System Evaluation

Each system failure mode is evaluated relative the sensor suite 30 to determine if the sensor suite 30 is able to detect abnormal system operation—failures and their precursors. The system evaluation produces a score for each sensor type in the sensor suite 30. This score would be, for example, high probability of detection, moderate probability of detection, low probability of detection, no probability of detection, and negative evidence. Negative evidence as defined herein is a lack of a particular feature that would constitute a probability that the failure mode exists. Conversely, for negative evidence, a particular feature which is present on the component that would otherwise be detectable would indicate that the failure mode probably does not exist.

For each sensor 32-44 (FIG. 1), the particular feature or features is identified to: (1) provide a list of required features to drive design of the system 10; (2) provide traceability for the design; and (3) provide data for implementing isolation capability. As an example for the gas turbine engine 10 (FIG. 1), the failure mode may be a main bearing which will begin to pit over a time period. As the metallic bearing material is released, an oil debris detection would have a high probability of detecting the failure. The pit damage will also change the bearing vibration signature, but early in the failure, this effect would be small, so the probability of detection (in relation to the probability of oil debris detection) would be moderate. It is conceivable that the bearing may run slightly warmer in that location, which could locally heat the oil, causing it to degrade faster than normal. A sensor to detect the oil condition may detect this change, but the probability would be low. At the early stages of failure, there would be no impact on oil pressure, so oil pressure monitoring would have no probability of detection.

A scoring system may be utilized to determine the detectability of each failure mode. The scoring system combines the scores of each sensor against a given failure mode. A combination of different sensor detections provides a higher score than that of only a single sensor. An approach to this in one non-limiting embodiment is a weighted score based on the detectability, and the number of detection methods available. As an example, nine points could be scored for each high probability detection, three for each medium probability detection, and one point for each low probability detection. No points would be scored for no probability of detection. The point count would be summed to determine the total score. Because multiple ways to detect a failure mode can reduce false positives, as an example only, a multiplier of 1.5 could be applied to the total score if there were two sensors contributing. The multiplier could be 2 for three sensors; and 2.5 for four or more sensors contributing.

The scoring system is examined for matching patterns of the particular detection feature or features. There may be cases where separate failure modes would have the same detection features such that the faults could be detected, but which fault occurred could not be determined (no isolation). A secondary scoring system would then be employed to determine isolation capability. Negative evidence is useful for isolation purposes. Negative evidence is useful for differentiating between two (or more) failure modes that would have otherwise identical signatures.

In the gas turbine engine 10 (FIG. 1) for example, a failure mode of degradation due to wear in the low pressure compressor 16 will show up as a temperature shift in a temperature sensor in the gas path downstream of the low pressure compressor 16. A possible failure mode of the temperature sensor is to exhibit a temperature shift; that is, read a lower or higher temperature than nominal. A shift in the measured downstream low pressure compressor temperature would thus be a high probability detection for both failure modes. The low pressure compressor failure mode, however, would also change the gas flow through other modules of the engine which also results in downstream changes. So a change in the exhaust temperature sensor would have a high probability of detecting the compressor fault. A change in the post-compressor temperature sensor reading and no change in the exhaust temperature sensor reading, however, would indicate failure of the downstream low pressure compressor temperature sensor. The lack of a change in the exhaust temperature is negative evidence of the post-compressor temperature sensor fault, providing isolation to the proper failure mode.

Where a failure mode is readily isolated, that is, the pattern of symptoms pointing to it is unique among other failure modes, a higher isolation score is accorded to that failure mode. As an example, the isolation score can be the weighted sum of the differences between the symptom patterns of faults. If two faults have identical symptom patterns, the isolation score would be zero. If two faults differ by one symptom, the score would be the value of that symptom; in the example above, nine points for a different symptom that was highly detectable, three points for a moderately detectable symptom, and so on. Negative evidence may be included where a highly detectable symptom not present would provide nine points, etc. The weighting scheme for valuing multiple differences may alternatively or additionally be used.

Gap Analysis

Figure 3:
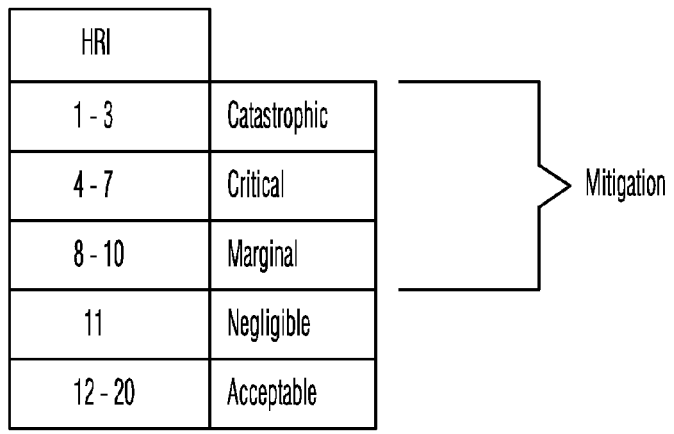
FIG. 3 illustrates a Hazard Risk Index.

With the detectability and isolation scores available for each failure mode, the failure modes are ranked by criticality and failure rate (failure weight weighted). Criticality is the impact on the system if the failure occurs. One approach is to produce a score based on criticality and probability in a Hazard Risk Index (HRI) (FIG. 3).

The HRI bins faults by severity to the system and probability of occurrence. It should be understood that hazards may be defined in terms of safety and/or economic impact to the system due to the failure. Catastrophic failures usually impact both safety and economic impact. Some faults are of marginal safety impact but result in severe economic impact. As an example, a four-engine aircraft may be able to fly quite safely on three engines, but the fault that destroys the engine is of severe economic impact.

In the gap analysis, each failure mode is evaluated for detectability and isolation capability against the HRI. That is, the determination of an acceptable detectability for a given HRI is a required system input. From a safety standpoint, the failure rates increase to a hazard target for the system. From an economic standpoint, the failure rates increase to a cost target. From an isolation capability standpoint, the failure rate increases up to a maintenance target as isolation primarily drives maintenance, among other metrics.

In a single engine aircraft for example, the complete loss of engine power presents a severe safety risk. However low, there is still an acceptable failure rate. This failure rate can be viewed as a 'budget' to be distributed among the different failure modes that can cause an engine to completely lose power. For example only, assume there are only three failure modes whose occurrence can cause the engine to completely lose power: the failure of a fuel pump; the complete failure of a particular main bearing; and the failure of a fan blade. If the acceptable failure rate of the engine is once every 10 million hours of operation, each of the failure modes could be allowed to occur one-third of that rate, or once every 30 million hours of operation.

To continue this example, assume that due to design and material limitation, the rate of a complete failure of the main bearing is once every 10 million hours. In that case, that bearing failure itself consumes the entire safety failure budget. However, if there are detection modes or precursors that will signal the main bearing is starting to fail, a repair can be effected before the fault leads to complete loss of engine power and a safety issue. If the warning can be given hours in advance of the failure, the engine can be repaired before the aircraft takes off. If the warning period is shorter, the pilot can take the time to land safely with full engine power. The detection modes would be evaluated for effectiveness at detecting the fault prior to complete failure of the bearing. If two-thirds of the time the detection modes could identify the fault in time to avoid a potential safety issue, then the bearing, combined with the monitoring, can meet the required safety rate.

To continue the example, as a bearing fails, the bearing quite often releases metal particles into the oil system which then flow to other parts of the engine. The longer the fault persists, the more particles are released, and the likelihood of this secondary damage to other modules of the engine accordingly increases. In this example, the sooner the fault is identified, the less damage to the engine, and the less the maintenance costs. Detection of the fault one hour before engine power loss may provide the required safety level, but the cost to repair the engine and overall economic damage may be unacceptably high while detection of the fault twenty hours before the complete failure may limit the engine damage. Not only will there still be no safety issue, there will be a lesser economic impact.

To continue the example, modern gas turbine engines are comprised of modules that can be disassembled for service. If the bearing failure can be detected 20 hours before complete failure, the engine can be serviced. Without isolation capability, each module would have to be inspected to determine the bearing failure. With isolation capability, the maintenance can be limited just to the module with the failure, reducing the cost and time to repair.

Detection gaps are thus determined from the Gap Analysis. Detection gaps are those failures that produce unsatisfactory scores in terms of detectability or isolation. These failures are then targeted for mitigation.

Once all of the failure modes have been evaluated, the failure modes can be compared to the total system requirements of safety, economics, and other metrics. These metrics may be applied to individual components, modules, and the system as a whole. In the example described above, the main bearing did not meet its safety requirement without additional monitoring. If that monitoring did not exist, then the system would have an unsatisfactory detection score. If there was no way to isolate bearing failures between modules, the increased maintenance cost may produce an unsatisfactory isolation score.

Mitigation

Failure modes identified by the Gap Analysis are then examined for detection underperformance. In this process, the reasons for the lack of detection documented in the System Evaluation phase are examined so as to increase the detection. One conventional approach is to improve the existing sensor suite. One intent of this disclosure is not to go the conventional route and improve the sensor suite. However, as an example of the conventional route, improvement to the sensor suite could consist of simply adding more sensors—more temperature and pressure sensors to the gas path, additional vibration sensors on individual components, etc. This conventional approach, however, increases weight, cost, and reduces reliability which the disclosure herein overcomes.

An approach in accords with that disclosed herein is a design change to the system to increase detection and isolation. These design changes should not impact normal operation of the system, but increase fault and fault precursor observability to the sensor suite.

As in the example above, it is desired to detect a bearing failure prior to total failure for safety reasons, and prior to the release of significant amount of metal particles for economic reasons. Both complete failure and large amounts of metal particles in the oil, also usually coupled with increased vibration of the damaged bearing, can be relatively easy to detect. Very early symptoms of bearing failure may be relatively difficult to detect as the damage/wear is minimal, produces almost no vibration signature and few metal particles in the oil. Another example for a lack of detection would be a ceramic bearing as the bearing material is not metallic and is not detected by conventional particle detection systems.

The following are examples of design changes to increase detectability and/or isolation of the non-limiting embodiments disclosed herein.

Example 1

Detection of Wear in Non-Ferrous Materials

Figure 4:
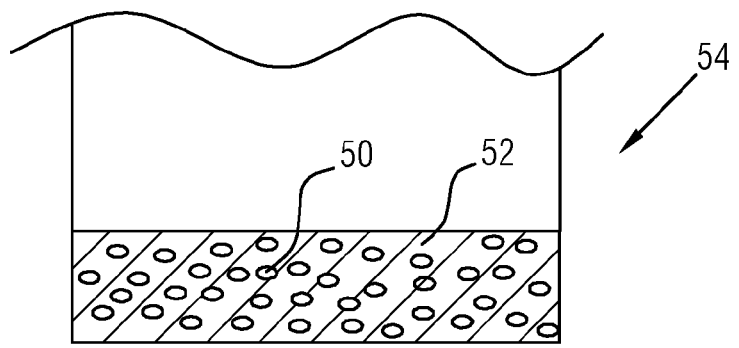
FIG. 4 is a schematic diagram illustrating detection of wear in non-ferrous materials.
Figure 4:
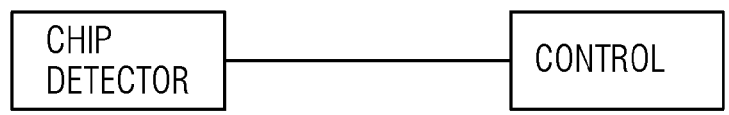

Referring to FIG. 4, Electromagnetic Oil Debris Monitoring (ODM) is not as effective on non-ferrous material as on ferrous materials. Chip detectors are useless with non-ferrous materials, and flow-through detectors are less sensitive to non-ferrous materials. In one non-limiting embodiment, small (100-200 micron) mild steel spheroids 50 which do not produce a cutting edge, are embedded in non-ferrous materials 52 of the particular system component 54, these ferrous spheroids would be released as the non-ferrous material is released with component damage or significant wear. These spheroids 50 would be easily detected by conventional ODM techniques. As a specific example, the engine may utilize a coating such as a lead-copper coating on the journal bearing. Damage to the journal bearing would therefore produce small particles of lead and copper, both of which are difficult if not impossible to detect with existing ODM technology. If there are small, non-damaging ferrous spheroids, detection of damage to this critical bearing surface prior to a catastrophic failure is readily detectable and identifiable.

Another specific example would be to embed ferrous particles in non-metallic oil washed components, such as bearing compartment seals.

Example 2

Isolation of Oil System Components

Figure 5:
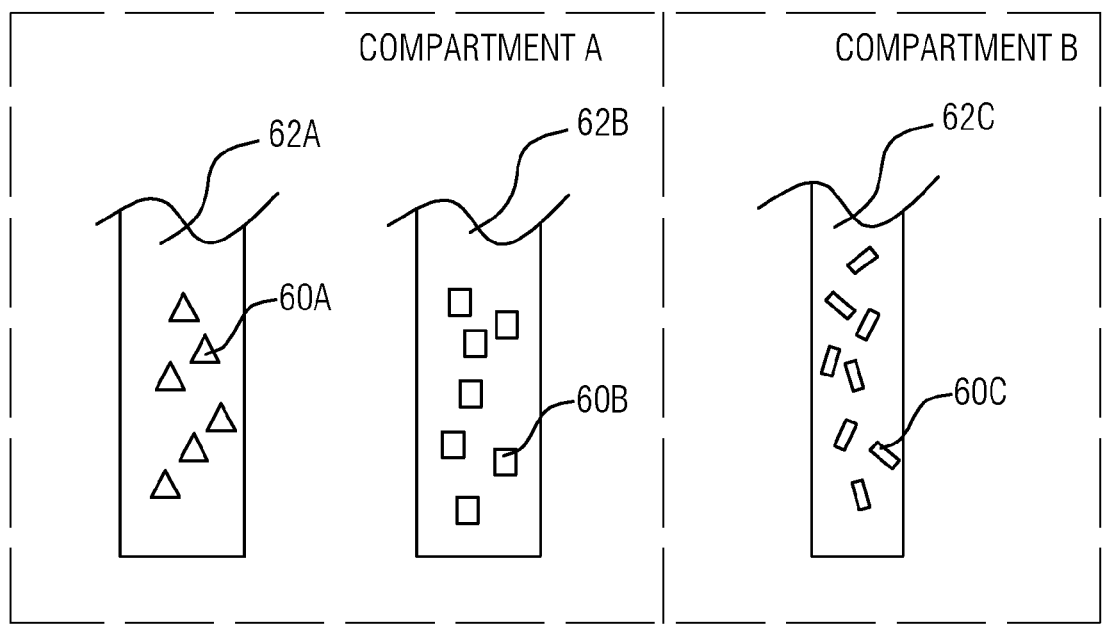
FIG. 5 is a schematic diagram illustrating isolation of oil system components.

Referring to FIG. 5, triggering an inspection based on particles in the oil system may not produce effective isolation of the particular component which suffers an abnormal occurrence, metal particles are present in the oil system, but the component is unknown. One non-limiting embodiment to increase isolation includes the addition of taggants 60—inert indications of where the material was released (illustrated schematically as different shapes). As one example, small plastic different color-coded taggants 60A, 60B, 60C are embedded in each bearing compartment seal (illustrated schematically as 62A, 62B, 62C). Microscopic analysis of the oil would then indicate both the seal and the bearing compartment which has suffered the abnormal occurrence. As schematically illustrated in FIG. 5, triangle taggants 60A within the oil would indicate oil seal 62A in compartment A has suffered the abnormal occurrence.

As another example, different alloys such as the different taggants could be used for different oil washed components such that oil analysis would isolate to the particular component.

Example 3

Vibration Signatures

Individual rotating components have vibration signatures based on health condition and rotational speed (a known). For some failure modes, detectability may be in response to particular vibratory modes. As a specific example, a pump component is designed such that as the efficiency degraded, impellers will produce a specific audio signature based on engine speed. Algorithms in the vibration sensing functionality are tuned to this specific signature so as to produce both detection and isolation.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the non-limiting embodiments disclosed herein.

The foregoing description is exemplary rather than defined by the limitations within. Many modifications and variations are possible in light of the above teachings. Non-limiting embodiments are disclosed herein, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A system designed for failure detectability comprising:
a holistic sensor suite having a multiple of sensor types, said holistic sensor suite operable to detect an abnormal occurrence in a system having a multiple of components in part through detection of a particular design feature specific to each of the multiple of components; and
a computing device in communication with the holistic sensor suite, said computing device operable to combine a score from each of the multiple of sensor types to isolate which of the multiple of components experienced the abnormal occurrence.

2. The system as recited in claim 1, wherein said system is a gas turbine engine.

3. The system as recited in claim 1, wherein said holistic sensor suite comprises a vibration sensor.

4. The system as recited in claim 1, wherein said holistic sensor suite comprises an oil debris monitoring sensor.

5. The system as recited in claim 1, wherein said multiple of components comprise a multiple of seals.

6. The system as recited in claim 1, wherein said particular design feature comprises unique color-coded taggants embedded in each of said multiple of components.

7. The system as recited in claim 1, wherein each of said multiple of components comprise a non-ferrous material component.

8. The system as recited in claim 7, wherein said particular design feature comprises a multiple of mild steel spheroids embedded in each of said multiple of components, said multiple of mild steel spheroids identifiable by said holistic sensor suite.

9. The system as recited in claim 1, wherein said particular design feature comprises a unique alloy for each of said multiple of components.

10. The system as recited in claim 6, wherein each of said multiple of components is a seal.

11. The system as recited in claim 7, wherein said particular design feature comprises unique alloy taggants embedded in each of said multiple of components, each of said multiple of components comprise a non-ferrous material component.

12. The system as recited in claim 7, wherein said particular design feature comprises unique ferrous taggants embedded in each of said multiple of components, each of said multiple of components comprise a non-ferrous material component.

13. The system as recited in claim 1, wherein said holistic sensor suite comprises at least one vibration sensor and at least one oil debris monitoring sensor.

14. The system as recited in claim 1, wherein said holistic sensor suite comprises at least one vibration sensor and at least one temperature sensor.

15. The system as recited in claim 1, wherein said holistic sensor suite includes at least one sensor in each module of a gas turbine engine.

16. The system as recited in claim 15, wherein said holistic sensor suite comprises at least one temperature sensor downstream of a compressor section and at least one temperature sensor downstream of a turbine section.

17. The system as recited in claim 15, wherein said holistic sensor suite comprises at least one vibration sensor.

18. The system as recited in claim 15, wherein said holistic sensor suite comprises at least one oil debris monitoring sensor.

19. The system as recited in claim 15, wherein said particular design feature comprises unique alloy taggants embedded in each of said multiple of components, each of said multiple of components comprise a non-ferrous material component.

20. The system as recited in claim 15, wherein said particular design feature comprises a multiple of mild steel spheroids embedded in each of said multiple of components, said multiple of mild steel spheroids identifiable by said holistic sensor suite.

21. A method of system design for failure detectability comprising:
incorporating a particular design feature into each of a multiple of components within a system;
detecting an abnormal occurrence in the system with a holistic sensor suite having a multiple of sensor types in part through the particular design feature specific to each of the multiple of components; and
combining a score from each of the multiple of sensor types with a computing device in communication with the holistic sensor suite to isolate which of the multiple of components experienced the abnormal occurrence.

* * * * *